United States Patent [19]

Arend et al.

[11] Patent Number: 5,667,350

[45] Date of Patent: Sep. 16, 1997

[54] BULK SHIP UNLOADER

[75] Inventors: Jürgen Arend, Saarbrücken; Horst Steckel, St. Ingbert, both of Germany

[73] Assignee: PWH Anlagen + Systeme GmbH, St. Ingbert, Germany

[21] Appl. No.: 641,096

[22] Filed: Apr. 29, 1996

[30] Foreign Application Priority Data

May 5, 1995 [DE] Germany .................. 195 16 472.5
Mar. 15, 1996 [DE] Germany .................. 196 10 219.7

[51] Int. Cl.$^6$ ................................................ B65G 67/60
[52] U.S. Cl. .................. 414/141.1; 198/519; 198/712; 414/141.8
[58] Field of Search .................. 198/519, 712; 414/140.7, 141.1; 143/141.8

[56] References Cited

U.S. PATENT DOCUMENTS

| 1,274,556 | 8/1918 | Jons . | |
| 2,022,300 | 11/1935 | Shaw | 198/712 X |
| 3,349,892 | 10/1967 | Barre | 198/519 X |
| 3,593,838 | 7/1971 | Latone . | |
| 4,957,198 | 9/1990 | Miller et al. | 414/140.7 X |

FOREIGN PATENT DOCUMENTS

| 0 056 474 | 7/1982 | European Pat. Off. . | |
| 0 242 193 | 10/1987 | European Pat. Off. . | |
| 2217250 | 9/1974 | France . | |
| 1893065 | 5/1964 | Germany . | |
| 1237499 | 3/1967 | Germany . | |
| 2 414 583 | 10/1974 | Germany . | |
| 25 23 948 | 12/1976 | Germany . | |
| 27 40 698 | 3/1978 | Germany . | |
| 2949958 | 7/1981 | Germany . | |
| 8209929 | 8/1982 | Germany . | |
| 3309738 | 11/1984 | Germany . | |
| 36 36 833 | 4/1987 | Germany . | |
| 3616458 | 9/1987 | Germany | 414/141.1 |
| 8805549 | 7/1988 | Germany . | |
| 3913359 | 6/1990 | Germany . | |
| 42 08 653 | 9/1993 | Germany . | |
| 123823 | 9/1980 | Japan | 414/141.1 |
| 58-89527 | 5/1983 | Japan | 414/141.1 |
| 59-64405 | 4/1984 | Japan | 198/712 |
| 64-8128 | 1/1989 | Japan | 414/141.8 |

OTHER PUBLICATIONS

Dr.K.Stosnach, "Schiffsentlader Nach Dem Screw–Conveyor–Prinzip Bietern Gute Restentladung", (f & h fordern und heben 37 (1987) No. 6, pp. 395–398.

Primary Examiner—Karen B. Merritt
Assistant Examiner—Janice L. Krizek
Attorney, Agent, or Firm—Herbert Dubno; Andrew Wilford

[57] ABSTRACT

An apparatus for continuously unloading bulk material from a bulk container has a carriage displaceable longitudinally adjacent the bulk container and an outrigger having an inner end pivotable about longitudinal and vertical axes on the carriage and an outer end. A conveyor extends between the ends of the outrigger. An arm has an upper end pivoted about a horizontal axis on the outer outrigger end and a lower end engageable in the container and contains a bucket conveyor. A pair of augers of opposite hand are mounted on the lower arm end and rotate to draw in the bulk material and pass it to the bucket conveyor.

19 Claims, 5 Drawing Sheets

BULK SHIP UNLOADER

FIELD OF THE INVENTION

The present invention relates to an apparatus for unloading bulk materials from a ship. More particularly this invention concerns such a device used for the continuous extraction of bulk material such as grain, fertilizer, coal, or ore from a container such as the hold of a barge, lighter, or the like.

BACKGROUND OF THE INVENTION

A standard apparatus for unloading bulk material from a ship or the like has a portal-type carriage or support that can normally move longitudinally on a dock or pontoons along the normally fixed ship and that carries an outrigger or boom having an inner end pivoted on the support and a vertically movable outer end positionable above the ship to be unloaded. A pendant arm has an upper end pivoted on the outer end of the outrigger and a lower end that can be dipped down into the bulk material.

Various conveyors are provided that extend along the outrigger and down the pendant arm as described in "Schiffsentlader nach dem Screw-Conveyor-Prinzip bieten gute Restenladung" (*Fördern und Heben;* 1987, no. 6), German 3,636,833 of Oy, European 0,242,193 of Addicott, German 4,208,653 of Grathoff, European 0,056,474 of Bl ättermann, German 2,414,583 of Riboulet, German 2,523, 948 assigned to Fördertechnik Hamburg Harry Lässig, and German 2,740,698 of Chever. Various combinations of bucket, screw, and belt conveyors are proposed.

As a rule these unloaders are custom made for the specific application. So that they are quite expensive and complex. Furthermore it is very rare for an unloader to be set up for loading bulk material into a ship or other container also, as the extra equipment is often excessively complex. Any dual-purpose loader/unloader is normally extremely expensive and hard to use for any of its functions.

OBJECTS OF THE INVENTION

It is therefore an object of the present invention to provide an improved bulk ship unloader.

Another object is the provision of such an improved bulk ship unloader which overcomes the above-given disadvantages, that is which is fairly simple and that can also be used to load a ship or the like.

A further object is to provide such an apparatus which can be used with different kinds of bulk materials, which protects the materials while moving them into or out of the container, and that is relatively cheap to operate.

SUMMARY OF THE INVENTION

An apparatus for continuously unloading bulk material from a bulk container has according to the invention a carriage displaceable longitudinally adjacent the bulk container and an outrigger having an inner end pivotable about longitudinal and vertical axes on the carriage and an outer end. A conveyor extends between the ends of the outrigger. An arm has an upper end pivoted about a horizontal axis on the outer outrigger end and a lower end engageable in the container and contains a bucket conveyor. A pair of augers of opposite hand are mounted on the lower arm end and rotate to draw in the bulk material and pass it to the bucket conveyor.

The double-auger intake head at the bottom of the bucket-conveyor arm ensures that the bucket conveyor is used to maximum capacity, with each bucket full. As the intake head is moved back and forth in the container, e.g. the hold of a ship, parallel to its floor, it is lowered with each pass to uniformly empty the bulk material from it. Normally the head is swept back and forth transversely. This so-called kick movement is effected through an angle only limited by the width of the hold through which the arm normally extends. Coupled with the carriage's ability to move longitudinally, the system of this invention normally only needs to sweep the intake head back and forth perpendicular to the container and no pivoting movement of the outrigger about a vertical axis is needed. Once a transverse strip of the cargo has been unloaded, the carriage is moved longitudinally and another transverse strip is taken out. Since the system works almost entirely in the transverse direction, it need merely be designed to withstand loads in this direction. It will not be significantly loaded with the outrigger extending in a direction other than perpendicular to the longitudinal travel direction of the carriage so its construction can be simplified. All of the forces it is subjected to in normal use can be reduced to pressure and tension with few bending moments. The outrigger is normally only pivoted about a horizontal axis to avoid obstacles such as masts or cranes on a ship, or to move it into an out-of-use position.

According to the invention a pair of adjacent hydraulic cylinders braced between the outrigger and the upper end of the arm pivot the arm about the horizontal axis on the outer outrigger end. The bucket-conveyor arm actually extends well up past the point where it is pivoted on the outer end of the outrigger and the two cylinders, which are operated jointly, extend between this uppermost end of the conveyor arm and the outrigger. Thus relatively short strokes of the cylinders can effect relatively large movements of the intake head at the lower end of the conveyor arm.

According to a further feature of the invention a hydraulic cylinder is braced between the carriage and the inner end of the outrigger for pivoting the outrigger about the longitudinal axis on the carriage. The lower end of this cylinder is pivoted on a downwardly projecting arm or horn of the carriage for maximum leverage. If more vertical movement is needed, the upper pivot point of the cylinder rod on the outrigger can be moved upward by means of a yoke assembly on the outrigger.

The arm in accordance with the invention is tubular and encloses the bucket conveyor. This serves both to contain any dust generated by the system and to protect the bulk material from the elements. Normally only the upwardly moving reach of the skip conveyor need be thus contained, although it is within the scope of the invention to contain both such reaches. The bucket conveyor itself includes an endless chain having reaches extending along the arm, and a plurality of buckets fixed to the chain. Respective struts extend between the buckets and the chain and bracing the buckets on the chain. Respective bolts each secure a respective one of the buckets on the chain and a respective one of the struts to the chain. Normally the tube enclosing the conveyor is of square section. The struts are effective to slowly accelerate the buckets at the turnaround points, greatly reducing wear of these parts.

The bucket conveyor includes at the lower arm end a sprocket over which the chain is engaged, and a shaft journaled in the lower arm end, fixed to and carrying the sprocket, and fixed to and carrying the augers. This ensures synchronous movement of the augers with the bucket conveyor while greatly simplifying the overall drive structure. No separate drive motors need be provided on the conveyor arm.

According to a further feature of the invention a shield is provided on the lower end of the arm along with a hydraulic actuator for raising and lowering the shield. This shield prevents that during the return movement of the intake head, that is toward the dock, material runs out of the conveyor arm. The position of the shield is set according to circumstances to ensure that bulk material is cleaned right down to the floor of the container. In a similar vein the shield carries a shutter engageable across the intake. This controls the flow into the intake.

A chute is provided at the outer outrigger end between the bucket conveyor and the outrigger conveyor. Thus the material falls down between the chains of the bucket conveyor onto the belt conveyor in the outrigger. In addition a takeoff conveyor extends underneath the carriage and another chute is provided at the inner outrigger end between the outrigger conveyor and the takeoff conveyor. This outer chute can be provided with a screw conveyor.

The outrigger according to the invention is also tubular and has an intermediate partition on which rides the upper stretch of the conveyor belt. The lower stretch rides directly on the inner surface of the square- or round-section tube.

For use of the system also to load the container a loading chute is provided on the arm having an upper end underneath an outer end of the outrigger conveyor and a lower end at the lower end of the arm. The outrigger conveyor is reversible to load material into the conveyor. A supply conveyor is provided at the outrigger inner end for supplying bulk material to the outrigger conveyor. The extra equipment necessary for such dual use of the machine is modest and greatly increases its usefulness.

To treat the bulk material, for instance fertilizer pellets or iron ore, gently a screw conveyor is provided between an upper end of the bucket conveyor and an outer end of the outrigger conveyor for transferring bulk material from the bucket conveyor to the outrigger conveyor. This screw conveyor is horizontal and is provided directly under the turnaround point of the bucket elevator with its rotation axis coinciding with that of the elevator's upper sprockets. Thus no matter what the angular position of the arm, this conveyor system will remain perfectly aligned. Such an installation eliminates the need for a separate drive for this screw conveyor since it can be coupled directly to the bucket conveyor. Alternately a flexible drive element—a chain—is engaged between one of the sprockets and the screw conveyor.

According to a further feature of the invention the lower end of the bucket elevator is provided with a hydraulic cylinder for raising and lowering the augers on the arm. This maintains the upwardly moving stretch of the conveyor chain taut. Guides can be provided for the downwardly moving stretch. Thus it is possible to accommodate vertical movements of the container, for instance a ship buffeted by waves.

The system of this invention is substantially lighter and cheaper than the prior-art devices. It therefore needs a less substantial base, be that a dock or pontoon float assembly. Furthermore it can be made smaller and, therefore, more mobile while using less energy. It can even be mounted on pneumatic tires and have its own prime mover.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
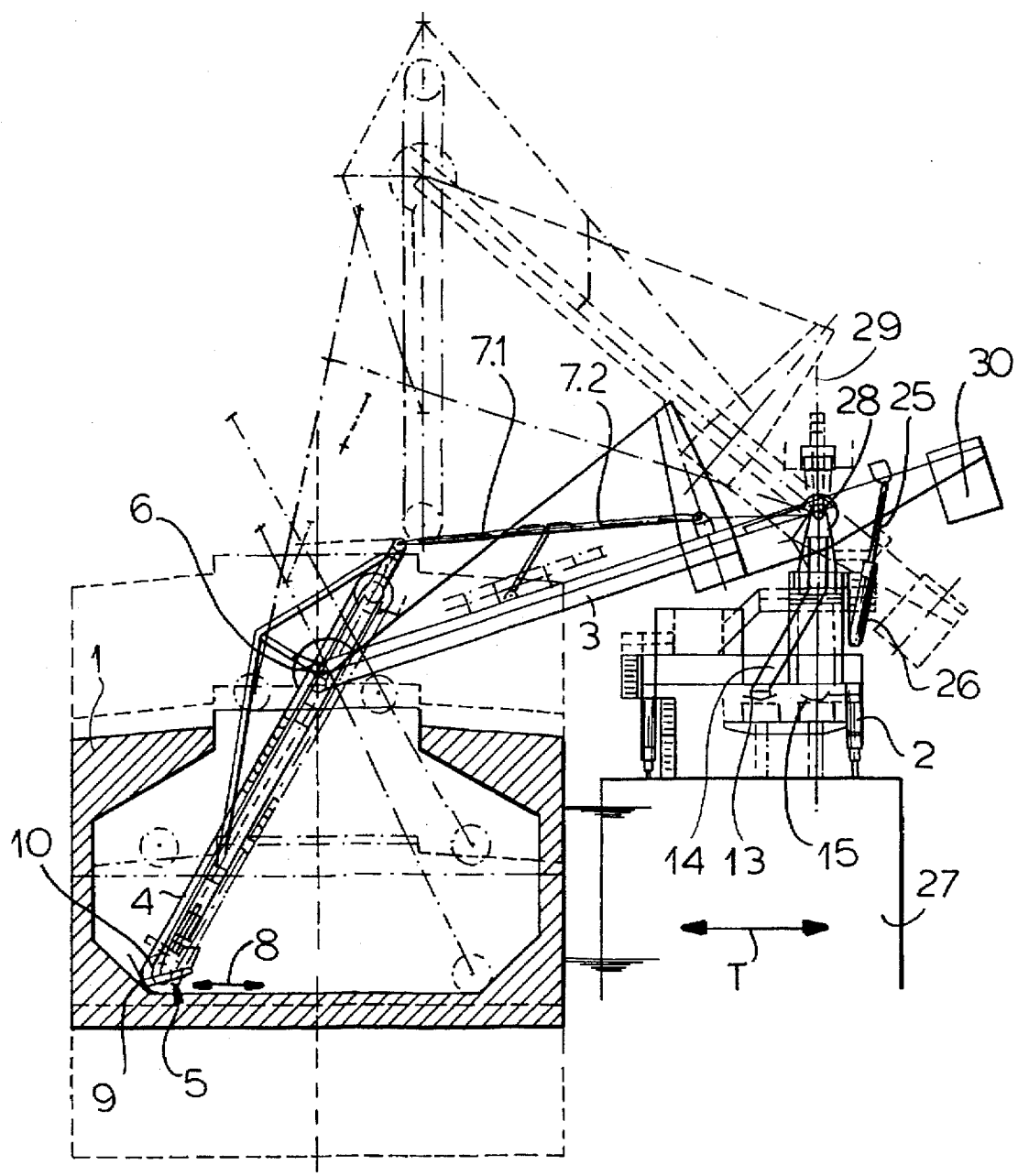
FIG. 1 is a small-scale and partly diagrammatic side view of the apparatus according to the invention.

As seen in FIGS. 1, 2, 4, and 5 a system for unloading bulk material from or loading it into a ship 1 has a portal-type support or carriage 2 that can travel in a longitudinal direction L on a dock 27 to which the ship 1 is moored. A counterweighted outrigger 3 has an inner end pivoted about horizontal and vertical axes 28 and 29 on the carriage 2 and an outer end defining a pivot axis 6 parallel to the axis 28 for a vertical conveyor 4 whose lower end is provided with a dual-auger pickup head 5. The structure of the conveyor 4 extends up past the axis 6 and a pair of double-acting hydraulic rams 7.1 and 7.2 are braced between the uppermost end of the conveyor 4 and a location on the outrigger near the axis 28. Thus extension and retraction of these actuators or rams 7.1 and 7.2 can pivot the conveyor 4 about the axis 6 as indicated by arrow 8 between the solid-line kicked-out position and a kicked-in inner position shown in dot-dash lines. Another hydraulic actuator 25 has an upper end secured to the inwardly projecting inner end of the outrigger 3, between the pivot axis 28 and a counterweight 30 on its innermost end, and a downwardly depending arm or horn 26 on the carriage 2. The entire outrigger 3 and its actuator 25 and arm 26 can pivot about the vertical axis 29. The combined ability of the carriage 2 to travel in the direction L and of the arm 3 to move the pickup head 5 transverse to this direction and up and down makes it possible for the pickup head 5 to sweep every corner of the hold of the ship 1.

Figure 2:
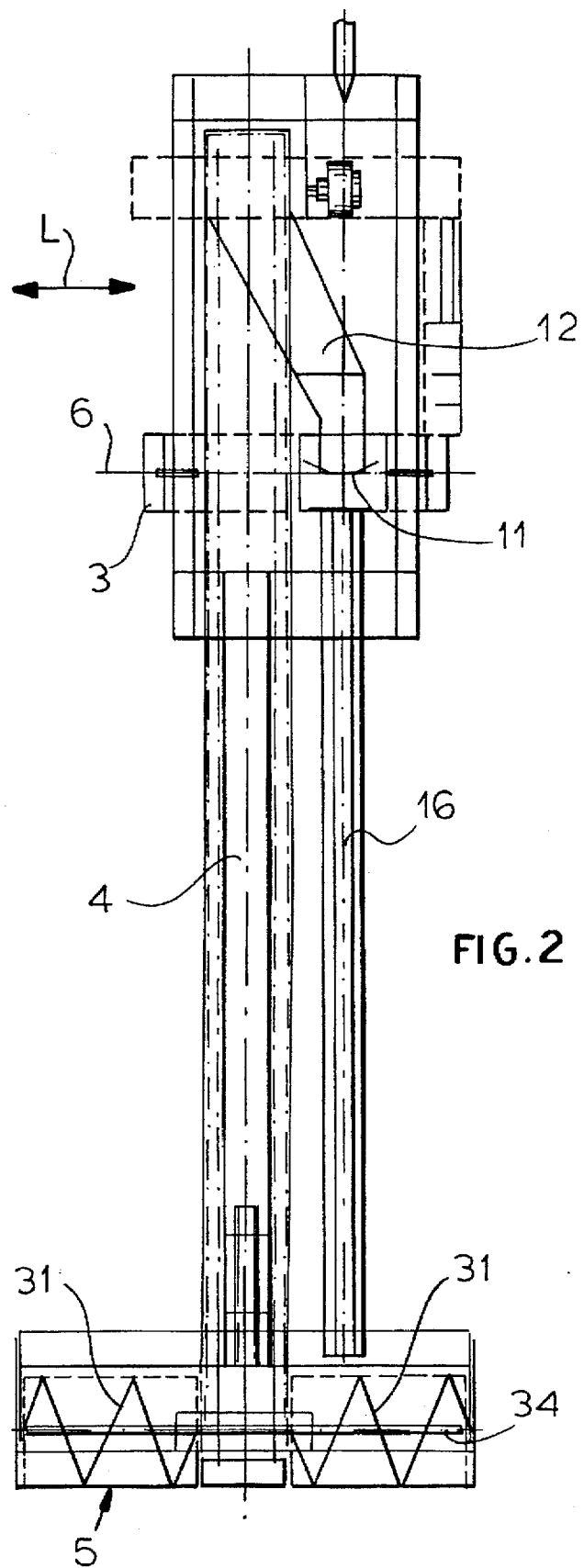
FIG. 2 is a larger-scale front view of the outer-end assembly of the apparatus of FIG. 1.
Figure 3:
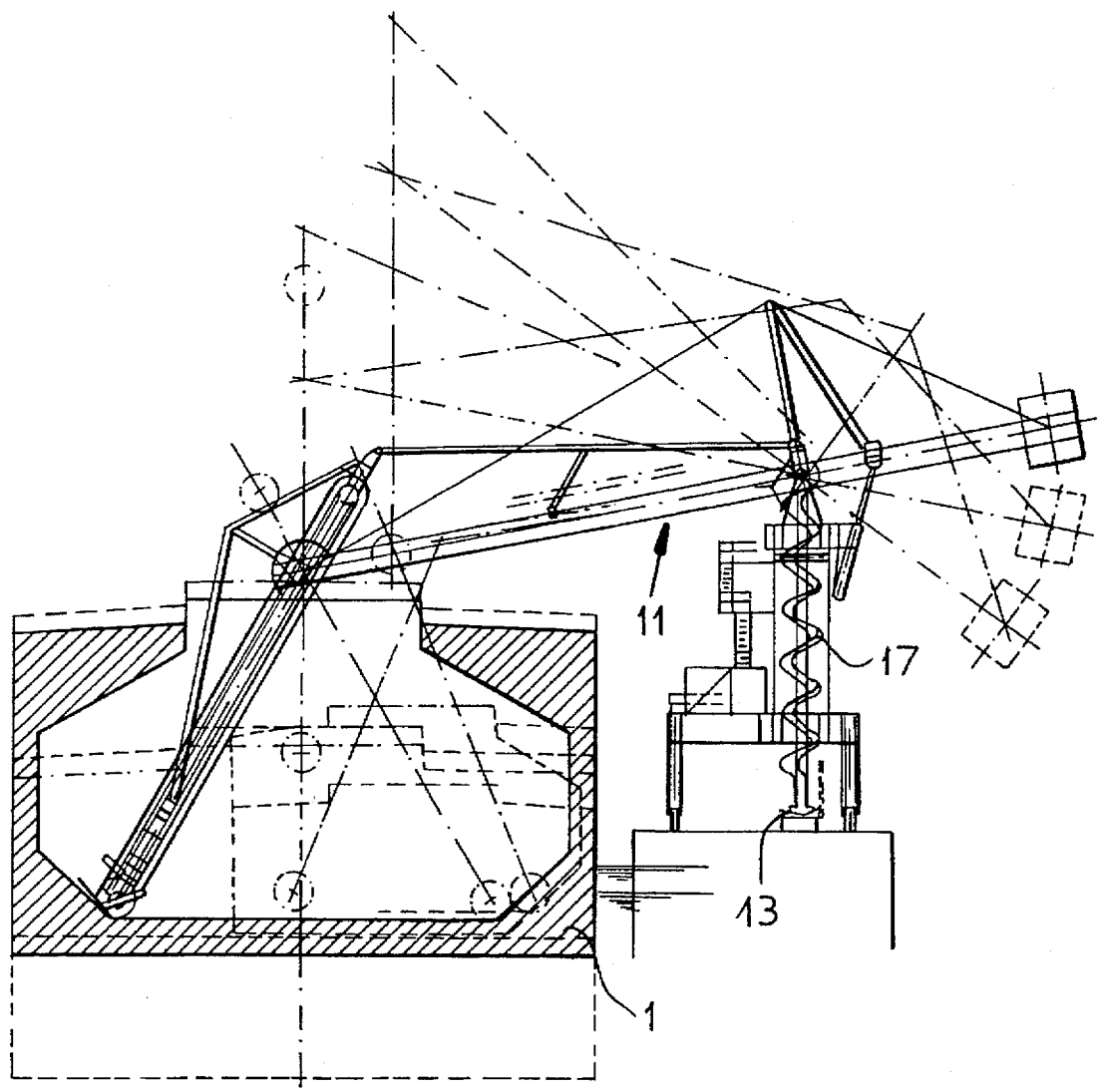
FIG. 3 is a view like FIG. 1 of another system according to the invention.
Figure 4:
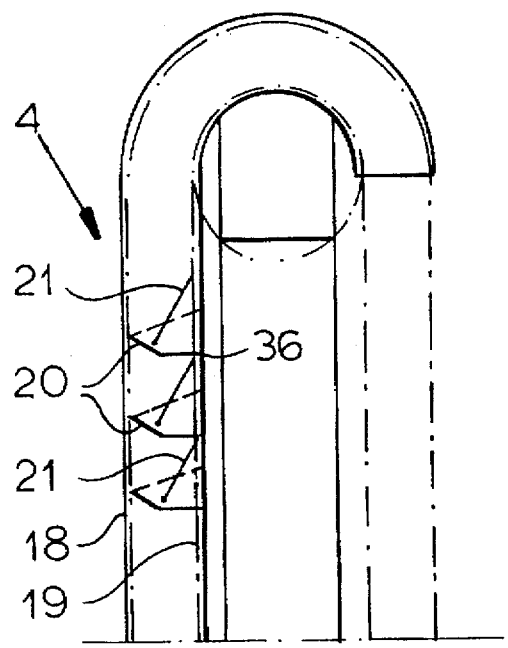
FIGS. 4 and 5 are larger-scale detail views of the top and bottom of the outer-end bucket conveyor or elevator.

The outrigger 3 is provided with a standard belt conveyor 11 whose upper reach is upwardly concave as shown in FIG. 2. The outrigger 3 is tubular and has an unillustrated intermediate partition on which an upper stretch of the conveyor 11 rides while its lower stretch rides on an inside surface of the outside wall of the outrigger 3. A chute 14 delivers material from the inner downstream end of the conveyor 11 to a takeoff conveyor 13 extending longitudinally along the dock 27. In FIG. 3 an arrangement is shown with an auger conveyor 17 used to transfer material to the dock-side conveyor 13.

The conveyor 4 includes an upright housing tube 18 holding an endless chain 19 carrying buckets or skips 20 supported by struts 21 so as to pick up bulk material at the bottom and drop it at the top into a chute 12 that deposits it on the outer upstream end of the conveyor 11. Bolts 36 secure each bucket 20 and the adjacent strut 21 to the chain so that each such bolt 36 does double duty. The arm 3 is similarly tubular to contain the conveyor 11 and thereby protect the material from the elements.

Figure 5:
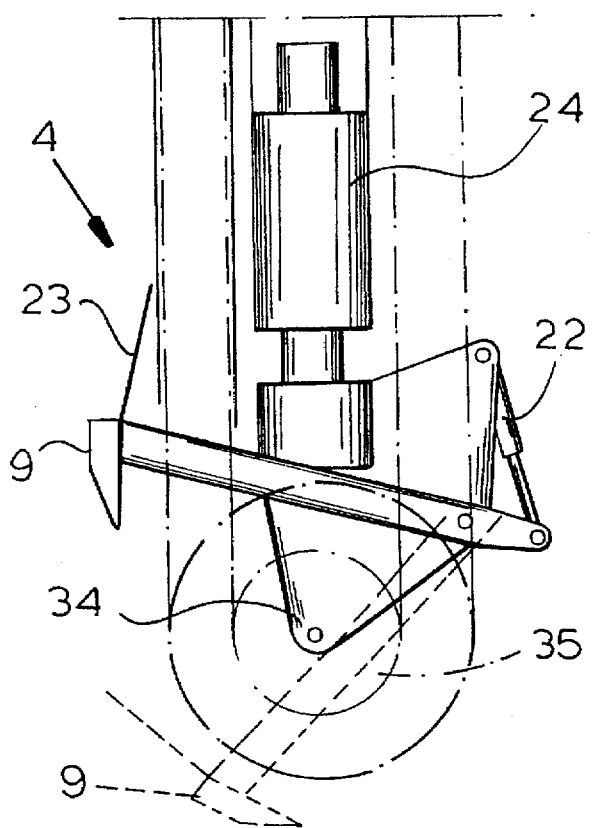

The pickup head 5 has a pair of augers 31 of opposite hand carried on a common horizontal shaft 34 that is fixed to the lower sprocket 35 about which the chain 18 passes as shown in FIG. 5. Thus the chain 18 and augers 31 are synchronously driven. A shield 9 pivotal on the lower end of the arm 4 carries a shutter 23 that can block the intake 10 of the head 5. An actuator 22 braced between the arm 4 and the shield 9 sets its position. In addition a hydraulic cylinder 24 is provided on the lower end of the conveyor arm 4 for raising and lowering the sprocket or sprockets 35 together with the shield 9.

For use of the system in loading the ship 1, the conveyor 11 is reversible and a chute 16 is provided between its upstream end and the head 5. Alternately to suppress dust the conveyor arm 4 can be used for deposition of bulk material in the ship 1. A supply conveyor 15 mounted on the dock 27 has a loop in its upper stretch diverted up above the inner end of the conveyor 11 to drop bulk material thereon.

Figure 6:
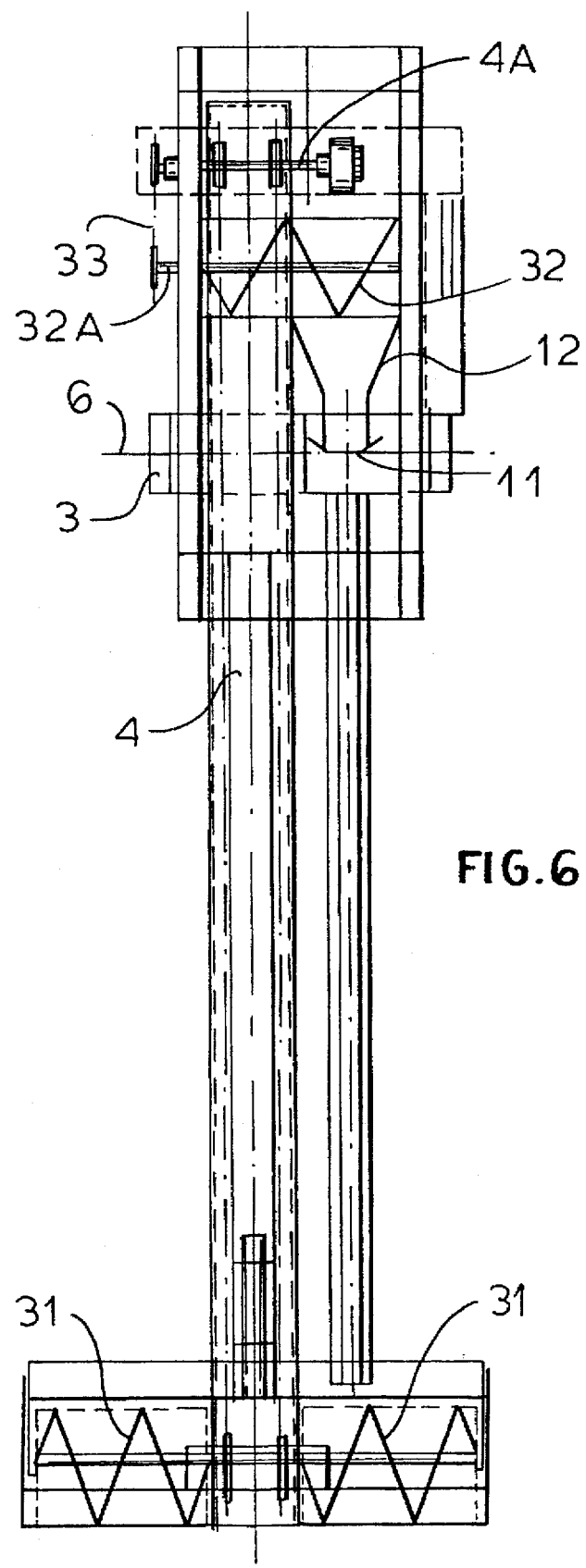
FIG. 6 is a view like FIG. 2 of another system according to the invention.

FIG. 6 shows a system where an upper-end drive shaft 4A of the chain 18 is coupled by a chain or other flexible drive element 33 to a drive shaft 32A of an auger 32 that is effective horizontally to shift material from the upper end of the conveyor 4 to the top of the chute 12 that deposits it on the belt 11.

We claim:

1. An apparatus for continuously unloading bulk material from a bulk container, the apparatus comprising:
    a carriage displaceable in a longitudinal direction adjacent the bulk container;
    an outrigger having an inner end pivotable about longitudinal and vertical axes on the carriage and an outer end;
    an outrigger conveyor extending between the ends of the outrigger;
    an arm having an upper end pivoted about a horizontal axis on the outer outrigger end and a lower end engageable in the container;
    a bucket conveyor in the arm;
    a pair of augers of opposite hand mounted on the lower arm end and rotatable to draw in the bulk material and pass it to the bucket conveyor; and
    means including a pair of adjacent hydraulic cylinders braced between the outrigger and the upper end of the arm for pivoting the arm about the horizontal axis on the outer outrigger end.

2. The apparatus defined in claim 1 wherein the arm is tubular and encloses the bucket conveyor.

3. The apparatus defined in claim 2 wherein the bucket conveyor includes
    an endless chain having reaches extending along the arm, and
    a plurality of buckets fixed to the chain.

4. The apparatus defined in claim 1, further comprising
    a shield on the lower end of the arm, and
    a hydraulic actuator for raising and lowering the shield.

5. The apparatus defined in claim 4 wherein the lower end includes an intake and the shield carries a shutter engageable across the intake.

6. The apparatus defined in claim 1, further comprising
    means including a hydraulic cylinder braced between the carriage and the inner end of the outrigger for pivoting the outrigger about the longitudinal axis on the carriage.

7. The apparatus defined in claim 1, further comprising
    a chute at the outer outrigger end between the bucket conveyor and the outrigger conveyor.

8. The apparatus defined in claim 1, further comprising
    a takeoff conveyor extending underneath the carriage, and
    a chute at the inner outrigger end between the outrigger conveyor and the takeoff conveyor.

9. The apparatus defined in claim 1 further comprising
    means including a hydraulic cylinder on the arm for raising and lowering the augers on the arm.

10. An apparatus for continuously unloading bulk material from a bulk container, the apparatus comprising:
    a carriage displaceable in a longitudinal direction adjacent the bulk container;
    an outrigger having an inner end pivotable about longitudinal and vertical axes on the carriage and an outer end;
    an outrigger conveyor extending between the ends of the outrigger;
    a tubular arm having an upper end pivoted about a horizontal axis on the outer outrigger end and a lower end engageable in the container;
    a bucket conveyor enclosed by the arm and including
        an endless chain having reaches extending along the arm,
        a plurality of buckets fixed to the chain,
        respective struts extending between the buckets and the chain and bracing the buckets on the chain; and
    a pair of augers of opposite hand mounted on the lower arm end and rotatable to draw in the bulk material and pass it to the bucket conveyor.

11. The apparatus defined in claim 10 wherein the bucket conveyor further includes
    respective bolts each securing a respective one of the buckets on the chain and a respective one of the struts to the chain.

12. An apparatus for continuously unloading bulk material from a bulk container, the apparatus comprising:
    a carriage displaceable in a longitudinal direction adjacent the bulk container;
    an outrigger having an inner end pivotable about longitudinal and vertical axes on the carriage and an outer end;
    an outrigger conveyor extending between the ends of the outrigger;
    a tubular arm having an upper end pivoted about a horizontal axis on the outer outrigger end and a lower end engageable in the container;
    a bucket conveyor enclosed by the arm and including
        an endless chain having reaches extending along the arm,
        a plurality of buckets fixed to the chain,
        a sprocket over which the chain is engaged, and
        a shaft journaled in the lower arm end, fixed to and carrying the sprocket, and fixed to and carrying the augers; and
    a pair of augers of opposite hand mounted on the lower arm end and rotatable to draw in the bulk material and pass it to the bucket conveyor.

13. An apparatus for continuously unloading bulk material from a bulk container, the apparatus comprising:
    a carriage displaceable in a longitudinal direction adjacent the bulk container;
    an outrigger having an inner end pivotable about longitudinal and vertical axes on the carriage and an outer end;
    an outrigger conveyor extending between the ends of the outrigger;
    an arm having an upper end pivoted about a horizontal axis on the outer outrigger end and a lower end engageable in the container;
    a bucket conveyor in the arm;

a pair of augers of opposite hand mounted on the lower arm end and rotatable to draw in the bulk material and pass it to the bucket conveyor;

a takeoff conveyor extending underneath the carriage; and a chute at the inner outrigger end between the outrigger conveyor and the takeoff conveyor, the chute being provided with a screw conveyor.

14. An apparatus for continuously unloading bulk material from a bulk container, the apparatus comprising:

a carriage displaceable in a longitudinal direction adjacent the bulk container;

an outrigger having an inner end pivotable about longitudinal and vertical axes on the carriage and an outer end;

an outrigger conveyor extending between the ends of the outrigger;

an arm having an upper end pivoted about a horizontal axis on the outer outrigger end and a lower end engageable in the container;

a bucket conveyor in the arm; and a pair of augers of opposite hand mounted on the lower arm end and rotatable to draw in the bulk material and pass it to the bucket conveyor; and a loading chute on the arm having an upper end underneath an outer end of the outrigger conveyor and a lower end at the lower end of the arm, the outrigger conveyor being reversible to load material into the container.

15. The apparatus defined in claim 14, further comprising a supply conveyor at the outrigger inner end for supplying bulk material to the outrigger conveyor.

16. An apparatus for continuously unloading bulk material from a bulk container, the apparatus comprising:

a carriage displaceable in a longitudinal direction adjacent the bulk container;

an outrigger having an inner end pivotable about longitudinal and vertical axes on the carriage and an outer end;

an outrigger conveyor extending between the ends of the outrigger;

an arm having an upper end pivoted about a horizontal axis on the outer outrigger end and a lower end engageable in the container;

a bucket conveyor in the arm;

a pair of augers of opposite hand mounted on the lower arm end and rotatable to draw in the bulk material and pass it to the bucket conveyor; and a screw conveyor between an upper end of the bucket conveyor and an outer end of the outrigger conveyor for transferring bulk material from the bucket conveyor to the outrigger conveyor.

17. The apparatus defined in claim 16 wherein the screw conveyor is horizontal.

18. The apparatus defined in claim 16 wherein the bucket conveyor includes an endless chain having reaches extending along the arm, a plurality of buckets fixed to the chain, sprockets at the ends of the chain, the apparatus further comprising a flexible drive element engaged between one of the sprockets and the screw conveyor.

19. The apparatus defined in claim 18 wherein the drive element is a chain.

* * * * *